United States Patent [19]

Wachtler

[11] 4,151,932
[45] May 1, 1979

[54] DISTRIBUTION TOWER FOR PARTICULATE MATERIAL

[76] Inventor: Frank A. Wachtler, Box 193, Spicer, Minn. 56288

[21] Appl. No.: 789,091

[22] Filed: Apr. 20, 1977

[51] Int. Cl.² ............................................ G01G 17/06
[52] U.S. Cl. .................................. 222/77; 222/144.5; 222/181; 222/241; 366/266
[58] Field of Search ...................... 222/77, 144.5, 181, 222/185, 227, 229, 239–242, 254, 411–413; 366/101, 141, 266; 308/237 R; 177/265

[56] References Cited

U.S. PATENT DOCUMENTS

| | | | |
|---|---|---|---|
| 157,635 | 12/1874 | Requa | 366/266 |
| 400,807 | 4/1889 | Toepfer | 222/241 X |
| 1,769,575 | 7/1930 | Haines | 366/266 |
| 1,859,290 | 5/1932 | Davis | 222/241 X |
| 3,477,533 | 11/1969 | Hyer et al. | 177/165 X |
| 3,780,993 | 12/1973 | Kline | 366/266 X |
| 3,807,705 | 4/1974 | Humkey et al. | 366/101 |
| 3,822,056 | 7/1974 | Hawes, Jr. et al. | 222/144.5 X |
| 3,946,909 | 3/1976 | Wheeler | 222/181 |

Primary Examiner—Allen N. Knowles
Assistant Examiner—Fred A. Silverberg
Attorney, Agent, or Firm—Williamson, Bains, Moore & Hansen

[57] ABSTRACT

An improved distribution tower for weighing and mixing particulate material such as chemical fertilizer has a plurality of storage containers therein for separate storage of various particulate materials and utilizes a combined weighing and mixing bin which is positioned below the storage containers to receive material therefrom, the bin being provided with an upright central auger for mixing and blending the material before discharging the material through a discharge duct at the base of the bin. The bin is also provided with a weight measuring scale to weigh quantities of material added thereto from the storage containers so as to permit predetermined fertilizer compositions to be formulated. In one embodiment the auger apparatus has radial paddles to better mix the material. A second embodiment utilizes a combined weighing and mixing bin wherein a funnel-like configuration of spaced-apart baffle plates is carried by the bin and intercepts and redistributes material discharged by the auger. An outwardly flared distribution shield is positioned below the baffle plates to intercept material from the plates and further distribute the material. The auger may have outwardly extending tabs adjacent its lower end for mixing material and may also have a radially extending arm at its upper end to discharge material outwardly toward the bin sidewalls.

12 Claims, 8 Drawing Figures

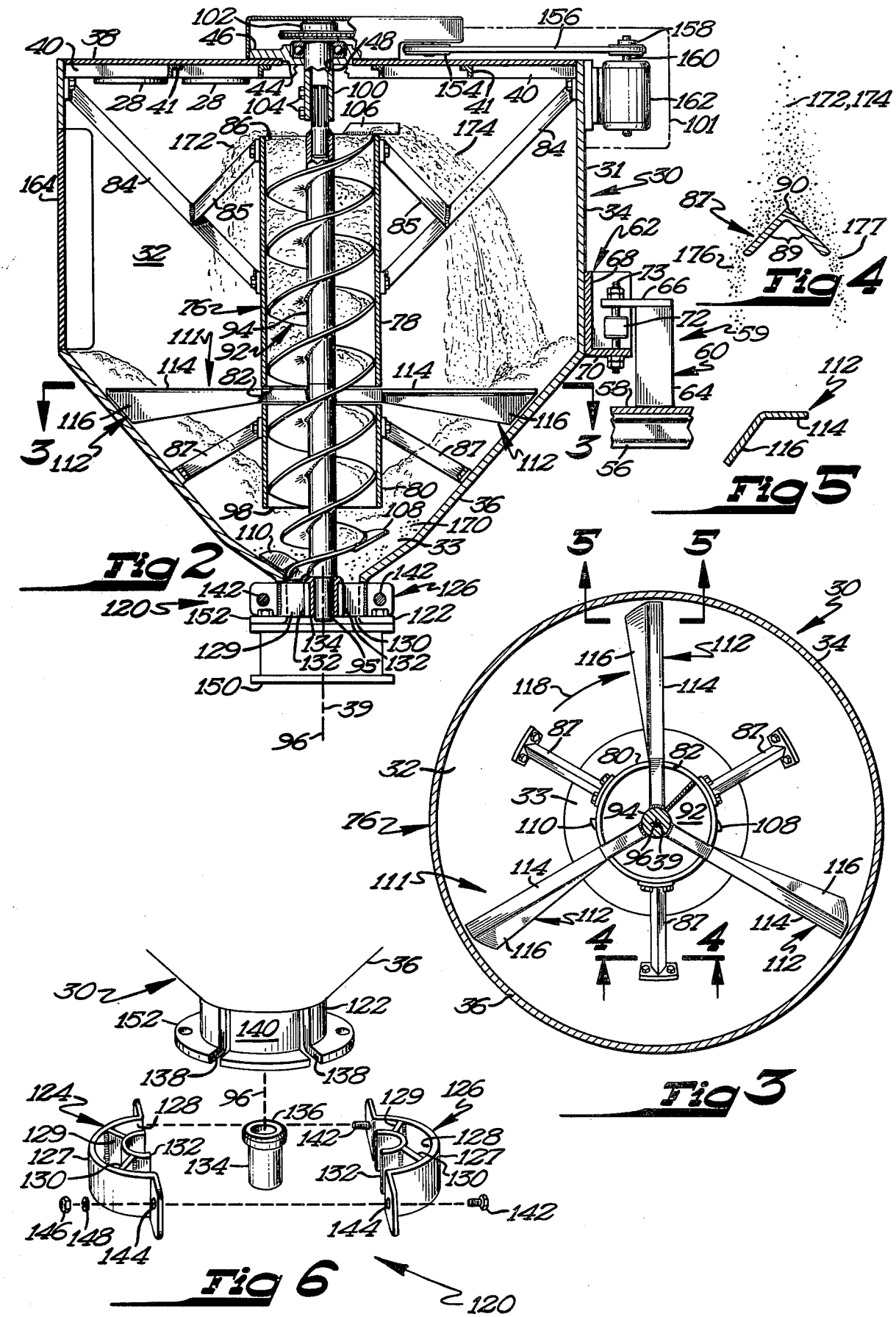

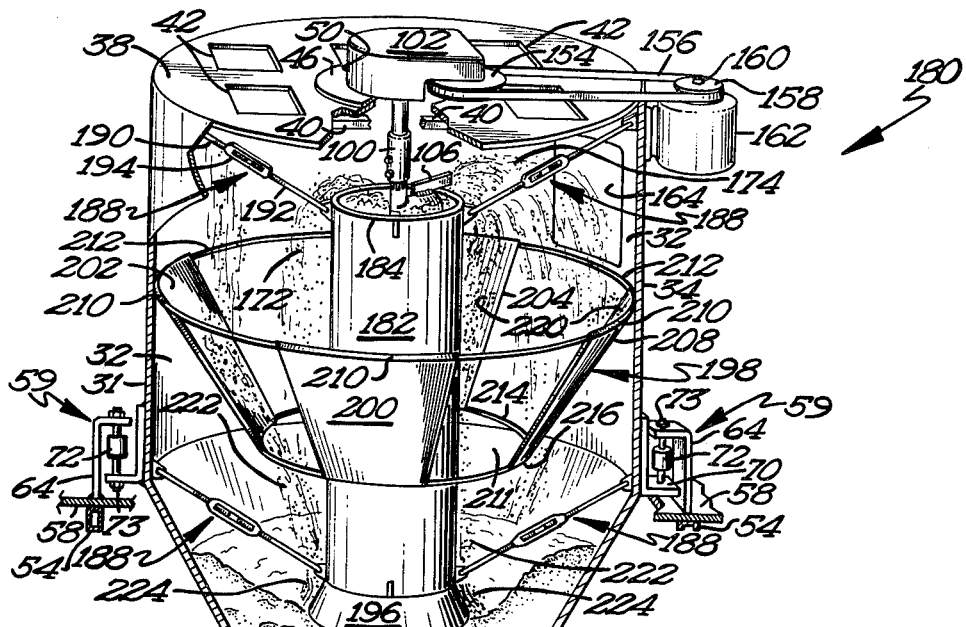
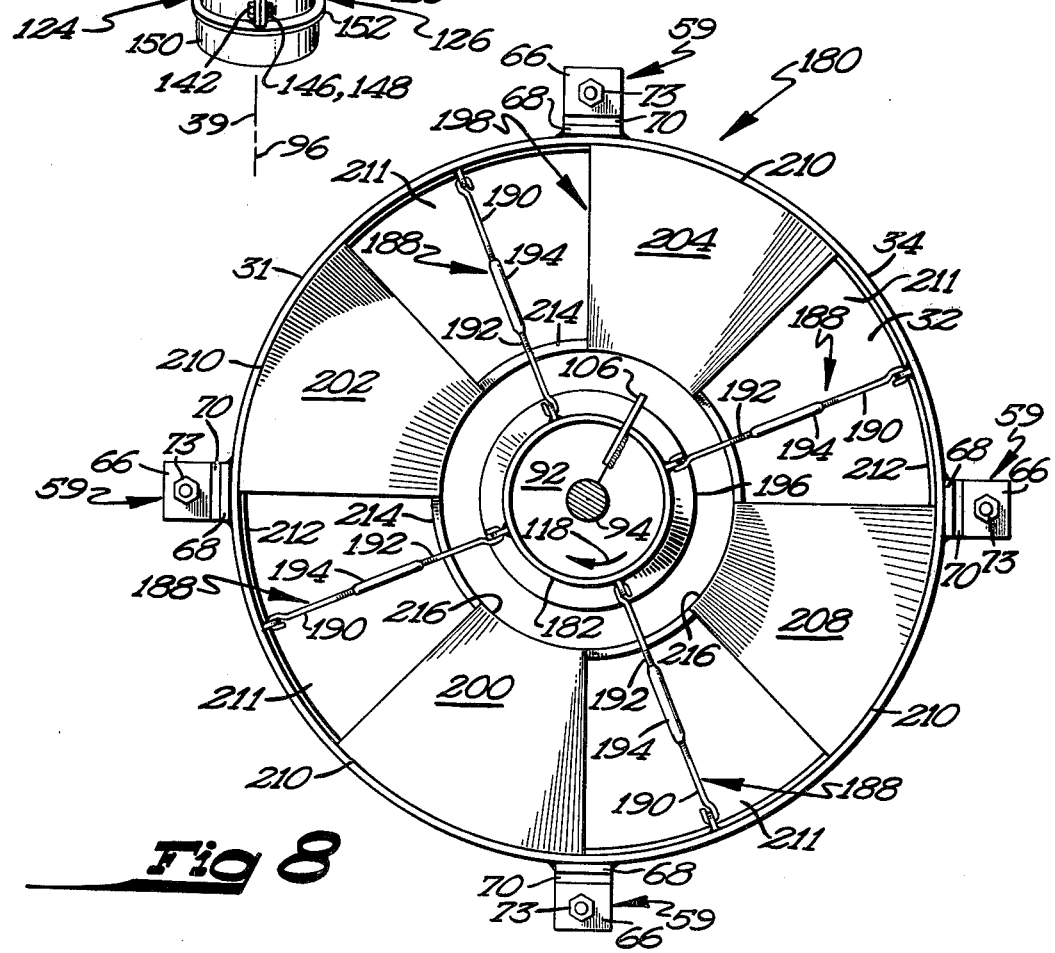
Fig 7
Fig 8

DISTRIBUTION TOWER FOR PARTICULATE MATERIAL

BACKGROUND OF THE INVENTION

The invention relates to the field of distribution towers for fertilizer and other particulate materials and increases the storage capacity of such towers as well as providing for accurate weighing of the material to permit the formulation of specific combinations of material, and the mixing and blending of the material to obtain a homogeneous mix.

Large, upright distribution towers are commonly utilized for storage of chemical fertilizer materials in most agricultural areas. Typically such towers are over fifty feet in height and have a plurality of fertilizer storage containers near the top of the tower for the separate containment of a number of different chemical fertilizers. The now available towers frequently have a weighing bin positioned immediately below the storage containers to weigh quantities of fertilizer material discharged from one or more containers to formulate a specific, predetermined blend of fertilizers for a particular farming requirement. After weighing, the materials are discharged to a second bin generally located below the weighing bin, and there are blended to obtain a homogeneous mixture. After blending in the second bin, the material is discharged into a truck and sold.

A serious shortcoming of these known distribution towers is their usage of two separate and fairly large bins for the weighing and mixing of the fertilizer material. Normally these large bins are positioned one above the other and collectively may occupy seventeen or moe vertical feet of the tower. If the space now occupied for mixing and weighing particulate material could be reduced, the tower height could be shortened. Alternatively, the internal storage capacity of the tower could be substantially increased without change in tower height.

Still another problem encountered with the known distribution towers is that the weighing and mixing bins utilize a substantial number of moving parts and because of the extremely corrosive nature of most commercial fertilizers, are prone to rusting and heavy wear in the caustic environment. In view of the continual presence of these corrosive materials, it is desirable to provide weighing and mixing equipment with few moving parts and wherein vulnerable parts are easily accessible for repair or replacement.

SUMMARY OF THE INVENTION

The invention comprises an improved distribution tower for chemical fertilizer or other particulate material wherein the previously separate weighing and mixing bins used with earlier towers are replaced by a substantially improved, single enclosure or bin in which all weighing and mixing of material is accomplished, thus freeing space which can be used for storage of additional material or permitting the tower height to be reduced.

The herein disclosed improved combined weighing and mixing enclosure or bin is stationary and positioned below the material storage containers and communicates with the containers so material can be deposited in the enclosure. The combined enclosure utilizes an upright, power driven auger which may be provided with outwardly extending mixing tabs near its lower end and a radially extending arm near its top to throw material raised by the auger outwardly toward the sidewalls of the enclosure. The enclosure is provided with weighing means such as a plurality of load cells to measure the weight of the particulate material deposited within the enclosure.

In one embodiment the auger has a plurality of radially extending paddles mounted to the auger shaft and which rotate with the auger to further mix the particulate material within the enclosure.

In a second embodiment, a funnel-like configuration of spaced-apart baffle plates are fixed to the bin sidewall and extend downwardly and toward the auger to intercept some particulate material dropped from the top of the auger and to deflect and guide intercepted material toward the auger and its adjacent casing. The casing can be provided with a flared distribution shield near its lower end to receive particulate material deflected from the baffle plates and to direct such material outwardly toward the sidewall of the enclosure to further encourage mixing of the material.

The advantages and novel features that characterize the invention are set out with particularity in the claims attached hereto and forming a part of this description. For a full understanding of the invention and the objects and advantages obtained through its use, reference should be had to the drawings which form a further part hereof and to the accompanying description in which is illustrated and described the preferred embodiments of the invention.

BRIEF DESCRIPTION OF THE DRAWINGS

FIG. 2 is a cross-sectional side elevation view of the combined weighing and mixing bin of FIG. 1.

FIG. 3 is a top elevation, cross-sectional view of the bin of FIG. 2 taken in the direction of arrows 3—3 of FIG. 2.

FIG. 4 is a cross-sectional view of a strut of FIG. 3 taken in the direction of arrows 4—4 of FIG. 3.

FIG. 5 is a cross-sectional view of a paddle blade taken in the direction of arrows 5—5 of FIG. 3.

FIG. 6 is an exploded perspective view of a bearing assembly used with the bin shown in FIG. 2.

FIG. 7 is a front perspective view of a second embodiment of a combined weighing and mixing bin embodying the invention.

FIG. 8 is a cross-sectional, top elevation view of the embodiment shown in FIG. 7.

DESCRIPTION OF THE PREFERRED EMBODIMENTS

Figure 1:
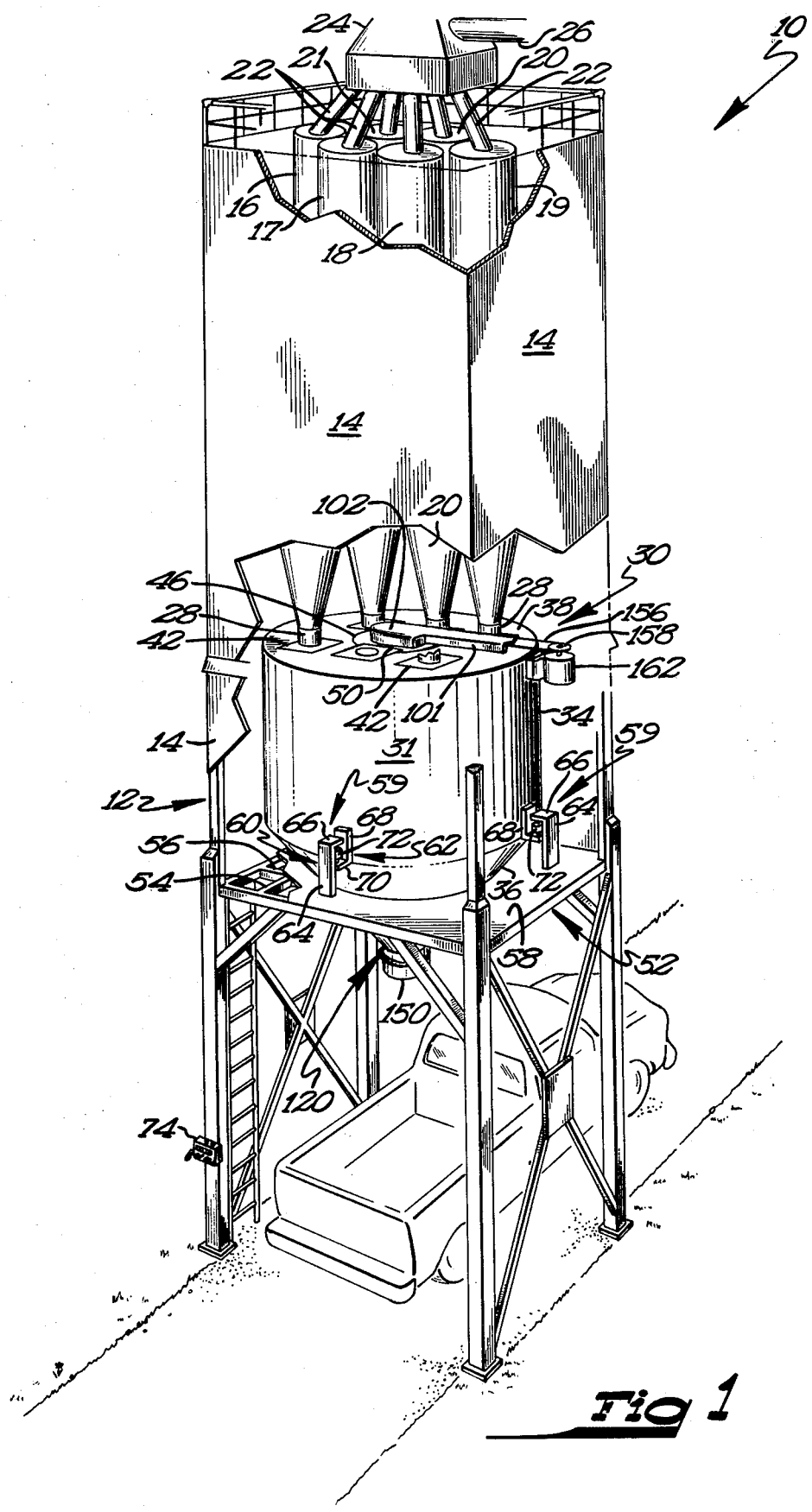
FIG. 1 is a front perspective, partially cutaway view of a distribution tower for particulate material and utilizing a combined weighing and mixing bin embodying the invention.

Referring now to FIG. 1, a distribution tower 10 for particulate material has a generally upright, rigid tower framework 12 to which is mounted in any known manner a plurality of protective outer surface panels 14 which serve to protect the various containers, bins and equipment housed within the tower as is well-known to the art.

Adjacent the top of the tower and supported by the tower framework 12, are a plurality of generally elongated, upright, closed, and closely spaced storage containers 16–21, each of which is separate and distinct and used for the storing of a quantity of particulate material, such as chemical fertilizer, grain, or the like. From the top of each storage container, an inlet duct 22 extends upwardly to a distribution housing 24 which in turn is connected through an auger-type conveyer 26 to a source of supply of the various particulate material desired to be delivered to the containers 16-21. The distribution housing 24 is commercially available and may comprise any device by which particulate material delivered from conveyer 26 may be selectively delivered to a single specific storage container selected by an operator. The containers of the tower 10 are designed to store up to six different, distinct varieties of fertilizer or other particulate material in the individual storage containers 16-21 so that the different materials may be combined as desired into various predetermined fertilizer combinations needed for specific farming requirements. Naturally, a greater or lesser number of bins may be used with the tower so as to make it adaptable to various mixing requirements.

At the bottom of each of the containers 16-21 is a container discharge valve 28 which may be of any type known to the art and which, when in a closed position, retains the particulate material within the overlying storage container, and which when in open position, discharges the material through the valve and into enclosure 30, described hereafter. The valves 28 selected should be controllable by an operator from a location remote from the valve 28 so the desired valve may be opened or closed from a control panel 74 at the base of the tower 10.

Referring now to FIGS. 1-6, below the storage containers 16-21 is a first embodiment 30 of a stationary combined mixing and weighing bin or enclosure which is carried by the tower framework and which defines an interior chamber 32 which communicates with the container discharge valves 28 so that particulate material from any container may be selectively received into the chamber 32.

The enclosure 30 has an upper, preferably cylindrical section 31 and a lower, preferably funneled or conical section 36 so as to direct and collect particulate material at the narrowed central region 33 of the chamber 32. While the enclosure is shown as being of circular cross section, it should be understood that other cross sectional configurations, such as elliptical, rectangular or square, are equally feasible and are within the purview of the invention. The chamber 32 has a peripheral sidewall 34 and a central axis oriented generally vertically. At the top of the enclosure 30 is a roof layer 38 which is supported on a plurality of underlying rigid metal beams 40 and 41, a pair of parallel, spaced apart beams 40 extending across the enclosure and being fixed to a second pair of parallel, spaced apart beams 41 which intersect the beams 40 at right angles. Inlet ports 42 are formed in the roof 38 to accommodate the container discharge valves 28 which are mateably received in the ports 42. To facilitate repair and inspection of the chamber 32, an entry door 164 to the enclosure 30 is provided.

The roof 38 has a central opening 44 passing therethrough and preferably centered on the central longitudinal axis 39 of the chamber. A sturdy, generally rigid, metal plate 46 rests on and is fixed to the roof 38 and has a central aperture 48 which communicates with the opening 44 of the roof. The plate 46 provides a reinforcing platform on which drive means may be mounted for rotating an auger 92 which is positioned in the chamber 30 and will be described further hereafter. The generally circular disk-like plate 46 is provided with a pair of notches 50 positioned diametrically opposite one another on the disk periphery so as to accommodate the container discharge valves 28 of containers 17 and 20.

Adjacent and encircling the combined weighing and mixing enclosure 30 is a platform 52 which includes a supporting matrix defined by a plurality of longitudinal beams 54 to which are joined a plurality of transverse beams 56, all of which cooperate to support the deck 58 of platform 52. The platform is fixed to and supported by the framework 12.

The enclosure 30 is supported on the platform 52 by four substantially identical pairs 59 of brackets 60 and 62, the pairs being equally spaced from one another about the enclosure 30. While four pairs 59 are shown, it should be understood that a larger or smaller number may be substituted and such changes are within the purview of the invention. In view of each pair 59 being substantially identical, only a single pair of brackets 60 and 62 will be described in detail.

The first bracket 60 has a rigid, substantially vertical segment 64 which is fixed to deck 58 which is supported on the beams 54 or 56 of the tower framework 12. The upper end of the segment 64 has a generally horizontal member 66 fixed rigidly to the segment 64 and extending cantileverly toward the enclosure 30, and at right angles to the segment 64.

The second bracket 62 is provided with a rigid upright segment 68 which is fixed to the outer periphery of the enclosure 30. Extending outwardly, cantileverly, and at a right angle from the lower end of segment 68 is a horizontal member 70 which is rigidly fixed to the segment 68. The first and second brackets 60 and 62 of each pair 59 are positioned closely adjacent each other and confront one another.

A commercially available load cell 72 is connected between the horizontal members 66 and 70 of each pair of brackets 59 by threaded shafts passed through the members 66 and 70 and nuts 73 threaded onto the shafts, resulting in the load cell being responsive to the weight of the enclosure 30 and its contents. The load cells 72 used for weighing the enclosure 30 are operatively electrically connected with electrical circuitry located within a control station 74 to permit an operator to visually determine the weight of particulate material in the enclosure 30 at any given time. The load cells 72 utilize strain gages to measure the deformation sensed by each cell 72, such load cells comprising a deformation responsive measuring means to measure weight applied to each first bracket 60 by each second bracket 62. The plurality of pairs 59 of brackets with their attached load cells 72 along with the control station 74 collectively comprise weighing means which are operatively connected with the enclosure 30 to weigh the particulate material within the chamber. Because the strain gage technology and electrical bridge systems commonly used with strain gage measuring apparatuses are well-known to the art, they will not be discussed further herein.

Referring now to FIGS. 2 and 3, within the chamber 32 of the combined mixing and weighing enclosure 30 is an elongated, generally cylindrical, substantially upright, stationary casing 76 which has its longitudinal axis aligned coaxially with the axis 39 of the chamber 32. The casing 76 has a hollow interior and includes upper and lower generally coaxial cylinders 78 and 80, respectively, which are spaced axially from one another by an intervening, generally annular gap 82.

The casing 76 is retained in its central position within the chamber 32 by a plurality of primary struts 84 and 87 which radiate from the casing 76 and extend to the sidewall 34. Struts 84 are bolted to upper cylinder 78 and extend outwardly upwardly from cylinder 78 to the sidewall 34, the outer end of the strut being attached by bolts to the sidewall 34. A secondary strut 85 extends between primary strut 84 and the upper cylinder 78 and has one end welded to strut 84 and the remaining end bolted to the cylinder 78 to reinforce primary strut 84 and support the upper cylinder 78. Similarly, the lower cylinder 80 is retained in position by a plurality of primary struts 87 which radiate outwardly and are angled downwardly from cylinder 80 and which have their ends bolted to the lower cylinder and to the sidewall 34. While a greater number of struts may be substituted, at least 3 struts 84 should be used to support the upper cylinder 78 and a like number of struts 87 be used to support the lower cylinder 80.

Each of the primary and secondary struts is substantially identical in cross section and, as best shown in FIG. 4, is V-shaped with an upwardly directed apex 90. It has been found desirable to utilize struts having a V-shaped cross section with the upwardly facing apex and downwardly angled webs 89 so that particulate material discharged downwardly from the top of the bin 30 will strike the webs 89 and be directed to either side of the apex by the V-shaped configuration, thereby further mixing and blending the material as best shown in FIG. 4 wherein particulate material 176 and 177 is shown being deflected outwardly laterally from the webs 89 of the strut 87.

Rotatably mounted within the casing 76 is an auger 92 having an elongated central shaft 94 whose central longitudinal axis 96 is aligned substantially coaxially with the axis 39 of the chamber 32. The auger 92 has lifting flights therealong designed to receive particulate material at the central region 33 adjacent lower end 98 of casing 76 and raise it to the upper end 86 of the casing. The upper end of the auger shaft 94 is preferably splined and is received within a mating splined socket 100 which is downwardly pendent from the gear box 102 described hereafter. Bolts 104 are passed through communicating bores through the socket 100 and the shaft 94 to retain the upper end of the shaft 94 within the socket, permitting the shaft 94 to rotate with the socket 100 about the shaft axis 96.

Adjacent the upper end 86 of the casing 76, a generally radially extending rigid arm 106 is fixed to the auger 92 and extends outwardly beyond the casing 76 to contact particulate material raised by the auger flights and urge and fling it outwardly toward the sidewall 34 of the enclosure 30.

Below the lower end 98 of the casing 76, the flights of the auger 92 are provided with outwardly extending rigid, metal mixing tabs 108 and 110 which are oriented generally transversely to the shaft 94 and permit the rotating auger to better mix particulate material in the region 33 adjacent the auger and to increase the effective radial reach of the auger flights.

Fixed to the auger 92 by welding and extending radially outwardly therefrom are a plurality of substantially identical paddle blades 112, here shown as three in number, although a greater or lesser number of blades may be substituted. The blades 112, which are spaced from one another by equal angles extend outwardly through the annular gap 82 of the casing 76 and terminate closely adjacent the sidewall 34 of conical section 36 of the enclosure 30. Accordingly, a plurality of blades 112 collectively comprise paddle means 111 for mixing the particulate material within the chamber 32.

Each blade 112 has an elongated leading portion 114 which is generally flat and parallel to the direction of travel 118 of the blade to slice easily through the material in the bin 30. Each blade additionally has an elongated trailing portion 116 which is fixed to the leading portion 114 and extends rearwardly, transversely downwardly from the leading portion at an angle of approximately thirty degrees to strike and mix particulate material adjacent the leading portion, as the paddle blades 112 move through the particulate material. The trailing portion 116 is located wholly outside of the casing 76, and only the leading portion 114 passes through the gap 82. As best shown in FIG. 3, the paddle means rotates with the auger shaft in direction 118.

The lower end of the auger shaft 94 has a reduced diameter portion 95 which is rotatably received and journaled in a bearing assembly 120 which is clamped to the outer periphery 140 of the discharge duct 122 near the bottom of the enclosure 30.

The bearing assembly 120 includes a pair of identical mating, arcutate collar portions 124 and 126, each collar portion having an outer band 127 whose arcuate part is of substantially constant radius and which has an inner, generally concave periphery 128 which bears against the periphery 140 of discharge duct 122 of the enclosure 30. A pair of rigid spokes 129 and 130 are fixed to the concave inner periphery 128 and extend inwardly therefrom, converging toward one another and having the spoke ends most distant from the outer band 127 fixed to an inner band 132, which is also arcuate, preferably of constant radius and is spaced from the outer band 127 by a distance equal to the spoke length. The inner bands 132 are adpated to receive and retain the auger shaft bearing 134 therebetween. The bearing is provided with a shoulder 136 at its upper end, the shoulder resting upon the inner bands 132 during operation.

The discharge duct 122 is of circular cross section and has four generally upright, spoke receiving slots or channels 138 spaced at equal angular intervals around the duct 122 through which pass the four spokes 129 and 130 of the arcuate collar portions 124 and 126, resulting in the outer bands 127 remaining outside the discharge duct 122 with their inner peripheries 128 closely bearing against the surface 140 while the inner bands 132 retain the auger shaft bearing 134 centered on the axis 96 of the auger shaft. With the arcuate collars 124 and 126 in position as shown in FIG. 2, bolts 142 are passed through apertures 144 in the collar portions and secured by nuts 146 with a lockwasher 148 being interposed between the band 127 and nut 146. The bolts 142, lockwashers 148 and nuts 146 collectively comprise one means for connecting the collar portions to clamp them to the enclosure, but it should be understood that other known connecting means may be substituted and are within the purview of the invention.

A commercially available enclosure discharge valve 150 is bolted to the horizontally oriented, annular flange 152 of the bearing assembly 120 to control downward discharge of particulate material from the enclosure 30. The discharge valve 50 selected may be any commercially available valve capable of containing the particulate material when in a closed position and releasing it when moved to an open position by an operator.

The socket 100 which engages the upper end of auger shaft 94 is connected to gearbox 102 which comprises a commercially available reduction gear system by which a predetermined, desirable rate of rotation is delivered by the gear box to the socket 100 and thence to the auger shaft 94. The gearbox 102 is energized through a rotatable pulley wheel 154 which is coupled through drive belt 156 to pulley 158 which is fixed to the shaft 160 of electric drive motor 162. A housing 101 covers the belt and pulleys. The motor 162 is connected to the control box 74 for selective actuation by the operator when it is desired to mix the contents of the bin 30. The gearbox 102 with its socket 100, the pulleys 154 and 158, belt 156 and motor 162 collectively comprise a drive means for the auger 92.

The upright casing 76, rotatable auger 92, mixing tabs 108 and 110, radial arm 106, paddle means 111, struts 84, 85 and 87, gearbox 102, motor 162 and bearing assembly 120 along with appropriate connecting and mounting hardware for these described components, collectively comprise one type of material mixing means usable with the combined weighing and mixing bin 30 to mix and blend the particulate material. While the mixing tabs 108 and 110, the arm 106, paddle means 111 and the struts 84, 85, and 87 are highly desirable, they are not essential to the effective operation of the auger. It has been found, however, that the tabs 108 and 110 along with the arm 106, the paddle means 111 and the struts contribute substantially to the thorough mixing of the material as will be more fully described hereafter, and accordingly, it is preferred that these components be utilized. Other variations of the mixing means will be disclosed hereafter in conjunction with a second embodiment 180 of the invention.

In operation, the operator first determines the amount by weight of each type of fertilizer or other particulate material which must be discharged from storage containers 16-21 into the combined weighing and mixing bin 30 to achieve the desired combination of particulate material. He then actuates the appropriate container discharge valve 28 of the storage container in which the first-to-be-added particulate material is stored, as by way of example, container 16. As the particulate material is discharged from the container 16 downwardly through the valve 28 and into the chamber 32, the operator watches the scale reading on control box 74, closing the discharge valve 28 when the desired weight of particulate material from container 16 has entered the enclosure 30.

As the material enters the chamber 32, the weight of the enclosure increases by the weight of the particulate material and the load applied through the plurality of brackets 62 to the load cells 72 gradually increases. This increased loading is sensed by the load cells 72 and detected by electrical bridge circuitry in the control and display box 74 in a manner well known to the art. Accordingly, the additional weight added to the enclosure 30 is visibly indicated on a scale readout display in box 74, insuring that the operator knows the weight of the material which has entered the enclosure. The operator then repeats this process of adding predetermined weights of other types of particulate material from the other storage containers 17-21 as contain material required for the desired combination, weighing the amount of each type of material with the scale 74 as the material is added. In this manner, the total weight of desired components are systematically assembled in the chamber 32, and such materials next require mixing and blending to achieve a generally homogeneous mixture.

To mix the combination, the operator next electrically actuates drive motor 162 to rotate the pulley 158, which is fixed to the motor shaft 160. Rotation of pulley 158 moves belt 156 to rotate pulley wheel 154 of the gearbox 102 causing rotation of the socket 100 about axis 96. Rotation of socket 100 rotates shaft 94 of auger 92 in the direction 118. As the auger 92 rotates about axis 96, the lifting flights raise particulate material 170 from the narrowed central region 33 upwardly through the casing 76, and then simply dropping much of the raised particulate material 172 over the end 86 of the casing 76. The radially extending arm 106 which rotates with the auger 94 strikes much of the particulate material being discharged from the casing and flings such material 174 outwardly from the casing 76 to better mix it and scatter it throughout the bin 30, as best exemplified by the material 172 and 174 which is shown being scattered outwardly toward the sidewall 34 of the bin.

Particulate material 172 and 174 discharged from the upper end 86 of the casing 76 drops downwardly, some of it striking V cross section struts 84, 85 and 87 and being deflected to either side of the apex 90 of the strut, as best shown in FIG. 4 wherein particulate material 176 and 177 are shown as being deflected and scattered within the bin. It should be noted that the additional mixing produced by the struts does not require expenditures of any additional electrical energy.

As auger 92 rotates, the leading portions 114 of the outwardly, radially extending paddle blades 112 slice through the particulate material to break up any lumps therein and to mix the material. The trailing portion 116 of each paddle blade strikes and plows through the material, urges the material along the path of the blade and downwardly and continually mixes and blends material adjacent each leading portion 114.

The outwardly extending mixing tabs 108 and 110, which are joined to the lower end of the auger 92 increase the outward reach of the lifting flights and aid in breaking up the clumps and mixing of the material as it is drawn toward and raised by the rotating auger 92. In this manner, the particulate material within the combined weighing and mixing bin 30 is continually raised by the auger and recirculated through the bin while the material is further mixed and blended by the cooperating action of the rotating paddle means 111 and the V cross section struts 84, 85 and 87 which intercept and further mix falling material 172 and 174. The described mixing and blending action of the mixing means results in a homogeneous blend of particulate material which after mixing is completed may be discharged from the enclosure 30 through the enclosure discharged valve 150, permitting the particulate material to drop from within the chamber 32, passing between the inner and outer bands 132 and 127, respectively of the bearing assembly 120, downwardly through the discharge valve 150 and into the bin of a truck or other transport device positioned below the valve.

Referring now to FIGS. 7 and 8, a second embodiment 180 of a combined mixing and weighing enclosure or bin is shown, such enclosure being usable with the tower 10 of FIG. 1 and in place of the enclosure 30 disclosed earlier.

All portions of the second embodiment 180 of the enclosure which are substantially identical to the enclosure 30, carry the same numbers as were used for the enclosure 30 and such portions will not be described further.

Referring now to the drawings, the enclosure 180 is similar in configuration to the enclosure 30 and is carried by the tower framework 12 by a plurality of pairs 59 of brackets which are interconnected by load cells 72, as was described in conjunction with the enclosure 30. Because the enclosure 180 is supported in identical fashion to the enclosure 30 and the weighing means, too, are substantially identical, they will not be described in further detail.

Positioned within the chamber 32 of the enclosure 180, is an elongated, generally cylindrical, substantially upright, stationary casing 182 having an upper end 184 and lower end 186. The casing 182 has a hollow interior and the cylinder's longitudinal central axis is generally coaxial with the central axis of the circular cross section enclosure 180 and is retained in its central orientation by a plurality of radially extending struts 188. Four such struts 188 are positioned adjacent the upper end 184 of the casing 182 and correspondingly, four generally similar struts 188 are positioned adjacent the lower end 186, the struts adjacent both upper and lower ends being separated from one another by generally equal angular intervals. Since all the struts 188 are substantially identical, aside from minor length variations, only one will be described in detail. Each strut 188 includes first and second elongated threaded rods 190 and 192 fixed to and extending from the sidewall 34 and the casing 182, respectively, and having their remaining free ends spaced from but confronting one another. The free ends of the threaded rods 190 and 192 are threaded and adapted to be received into a central turnbuckle 194. By adjusting the turnbuckles of the various struts, the casing 182 may be accurately centered on the axis 39 of the chamber.

Adjacent the lower end 186 of the casing 182, a flared distribution shield 196 is fixed to the casing and has a generally outwardly, downwardly angled surface which is preferrably, but not necessarily conical. The flared, conical surface of shield 186 has its cone axis coaxial with the axis 39 of the chamber and is used to intercept downwardly falling particulate material and to deflect the material outwardly toward the sidewall 34 of the bin 180 to thereby aid mixing of the material and to discourage the particulate material from dropping straight downwardly to the narrowed central region 33 of the conical section 36 of the enclosure.

Rotatably mounted within the casing 182 is an auger 92 substantially identical to that described in conjunction with the embodiment 30 except that the paddle means 111 are not shown with the embodiment 180. The lower end of the auger 92 may be provided with the earlier described, outwardly extending mixing tabs 108 and 110, and the shaft 94 of the auger is rotatably journaled in a bearing assembly 120 like that already described in conjunction with the embodiment 30 and is substantially coaxial with the central axes of the casing 182 and chamber 32. The upper end of the auger 92 may be provided with the radially extending arm 106 described in conjunction with the embodiment 30. The upper end of the auger shaft 94 is connected with the socket 100 and the drive means for the auger used with embodiment 180 is identical to that described in conjunction with the embodiment 30.

Positioned within the chamber 32 is a funnel-like configuration 198 comprised of a plurality of baffle plates 200, 202, 204 and 208 which are stationary, spaced apart from one another along the sidewall 34 by intervening openings 211, and extend from the sidewall of the chamber toward the casing 182 to intercept some of the particulate material discharged from the upper end 184 of the casing and to direct such material inwardly toward the casing. While the upper edge 210 of each of the baffle plates may be attached directly to the sidewall 34 of the enclosure 180 in any known manner, it is preferred to utilize a generally circular band 212 which is rigidly fixed to the upper edge 210 of each baffle plate and is also secured to the sidewall of the chamber in any known manner. A lower band 214 is generally concentric with the casing 182 and is fixed to the lower edge 216 of each baffle plate to retain the plates in the generally funnel-like configuration 198.

The casing 182, auger 92, the drive means described earlier, the radially extending arm 106, the flared distribution shield 196 and funnel-like configuration 198 collectively comprise one type of mixing means usable with the enclosure 180. In addition, but not essential, the mixing tabs 108 and 110 are desirable, and when present, comprise further portions of the mixing means.

In operation, an operator will add several distinct types of particulate materials from the storage containers 16–21 to the enclosure 180, weighing the amount of each type of material in turn, as was described in conjunction with the embodiment 30. The weighing means and the process by which the material is weighed is identical to that described in conjunction with the embodiment 30.

When it is desired to mix and blend the particulate material assembled within the enclosure 180, the operator actuates the motor 162 which, as described for the earlier embodiment, results in the shaft 94 of the central auger 92 to begin rotation about the axis 96.

Particulate material adjacent the lower end of the auger 92 in region 33 is picked up by the lifting flights of the auger and raised through the casing 182 and dropped over the upper end 184 of the casing as indicated by material 172. As was described earlier for the embodiment 30, the radially extending arm 106 contacts some of the particulate material as it leaves the upper end 184 of the casing and flings such material 174 outwardly from the casing to further mix the material. As the particulate material 172 and 174 falls downwardly from the upper end 184, some of the material, designated as 220 is intercepted by the baffle plates 200, 202, 204 and 208 and slides, bounces or is deflected along the baffle plates inwardly, downwardly toward the casing 182. Such material leaves the baffle plates and either strikes the casing 182 or the distribution shield 196 as indicated by material 222 and is then bounced outwardly off shield 196 toward the sidewall 34 of conical section 36 of the enclosure, as shown at 224. Accordingly, flared distribution shield 196 tends to reduce the hour-glass effect of the particulate material to drop directly to the bottom region 33 of the conical section 36 and produces additional mixing without the expenditure of additional electrical energy.

Particulate material 172 which was simply dripped over the upper end 184 of the casing and which did not strike any of the baffle plates 200, 202, 204 and 208 will pass downwardly through the intervening openings 211 separating the baffle plates or the annular space between casing 182 and band 214 and drop directly to the bottom of the bin or, possibly, strike the flared distribution shield 196 and be subject to some additional outward deflection.

Accordingly, the funnel-like configuration 198 and the flared distribution shield 196 cooperate in mixing material by receiving some of the particulate material 172 and 174 dropped from the upper end 184 of the casing, directing quantities 220 and 222 of the particulate material inwardly toward the casing 182 and toward the flared distribution shield 196 and then the shield reflecting and bouncing such material outwardly toward the sidewall 34 of the enclosure to greatly increase the mixing action within the bin without the expenditure of any additional electrical energy. The radially extending arm 106 cooperates with the configuration 198 by throwing or flinging the material outwardly to better strike the plates 200, 202, 204 and 208. The particulate material is, of course, continually recirculated through the auger 94 and casing 182 until thoroughly blended and substantially homogeneous.

While the use of the funnel-like configuration 198 and the flared distribution shield 196 are shown as being used with the embodiment 180, it should be understood that the configuration 198 with or without the flared distribution shield 196 may be utilized in the embodiment 30 with the funnel-like configuration 198 being positioned above the path of the paddle means 111.

As a result of the disclosed invention, a distribution tower can be constructed utilizing a combined weighing and mixing bin 30 or 180 as set out herein and the tower space which has been devoted to separate weighing bin and separate mixing bin in commercially available towers is thus conserved. This now available, additional space can be utilized for the storage of additional particulate material in larger storage containers or alternatively, the height of the tower may be reduced, resulting in a saving of material and a more efficient and effective distribution tower.

While the preferred embodiments of the present invention have been described, it should be understood that various changes, adaptations and modifications may be made therein without departing from the spirit of the invention and the scope of the appended claims.

What is claimed is:

1. A distribution tower for storing particulate material and for weighing and mixing predetermined combinations of such material comprising:
   an upright tower framework;
   a plurality of storage containers for the particulate material, each said storage container being supported by said tower framework and each including a container discharge valve thereon capable of selectively discharging the material from said storage container; a single combined weighing and mixing chamber carried by said tower framework and in which material is wholly retained during weighing of the material and continues to be wholly retained during mixing of the material, said chamber communicating with said container discharge valves of said plurality of storage containers so as to receive material discharged from said containers;
   an enclosure discharge valve communicating with said chamber of said enclosure to selectively discharge particulate material from said chamber;
   weighing means operatively connected with said combined chamber to weigh material deposited within said chamber and to visably indicate the weight of the material in said chamber to an operator to thereby permit predetermined quantities of the material from said storage containers to be combined in said chamber in predetermined weight combinations; and
   material mixing means extending within said chamber for mixing particulate material within said chamber to obtain a generally homogeneous mixture of such material wherein said material mixing means includes: a substantially upright, stationary, hollow casing having upper and lower ends, said casing being positioned within said chamber; an auger having an elongated shaft with a central longitudinal axis and lifting flights along said shaft, said auger being mounted for rotation about said shaft axis within said casing to raise the particulate material from said lower end of said casing to said upper end of said casing to thereby circulate and mix the particulate material within said chamber; and wherein said enclosure discharge valve is positioned below said auger and substantially on said longitudinal axis of said auger shaft.

2. A distribution tower for storing particulate material and for weighing and mixing predetermined combinations of such material comprising:
   an upright tower framework;
   a plurality of storage containers for the particulate material, each said storage container being supported by said tower framework and each including a container discharge valve thereon capable of selectively discharging the material from said storage container;
   an enclosure carried by said tower framework and defining a chamber, said chamber communicating with said container discharge valves of said plurality of storage containers so as to receive material discharged from said containers;
   an enclosure discharge valve communicating with said chamber of said enclosure to selectively discharge particulate material from said chamber;
   weighing means operatively connected with said enclosure to weigh material within said chamber and to visibly indicate the weight of the material in said chamber to an operator to thereby permit predetermined quantities of the material from said storage containers to be combined in said chamber in predetermined weight combinations;
   material mixing means extending within said chamber of said enclosure for mixing particulate material within said chamber to obtain a generally homogeneous mixture of such material;
   said material mixing means including: a substantially upright, stationary, hollow
      casing having upper and lower ends, said casing being positioned within said chamber; an auger having an elongated shaft with central longitudinal axis and lifting flights along said shaft, said auger being mounted for rotation about said shaft axis within said casing to raise particulate material from said lower end of said casing to said upper end of said casing to thereby circulate and mix particulate material within said chamber;
   said casing being cylindrical and including upper and lower generally coaxial cylinders separated by an intervening gap; and
   said material mixing means including paddle means fixed to said auger shaft and extending outwardly from said auger shaft and through said intervening gap to rotate with said auger shaft so as to mix particulate material within said chamber.

3. The distribution tower of claim 2 wherein said paddle means includes a plurality of paddle blades, each said blade extending generally radially outwardly from said auger shaft and said blades being separated from one another by substantially equal angles.

4. The distribution tower of claim 3 wherein:
each said paddle blade has an elongated generally flat leading portion lying in a plane substantially parallel to the direction of travel of said leading portion so as to slice through the particulate material; and
each said paddle blade has an elongated trailing portion fixed to said leading portion and angled transversely thereto to strike and mix material adjacent said leading portion as each said paddle blade moves within said chamber.

5. The distribution tower of claim 4 wherein said enclosure includes an upper cylindrical section and a contiguous lower conical section, said sections being coaxial, and said auger shaft being positioned on the central axes of said upper and lower sections.

6. The distribution tower of claim 2 wherein said casing is supported within said chamber by a plurality of struts having V-shaped cross sections and extending between and fixed to said casing and said enclosure, and each said strut having the apex of its V facing upwardly so that material dropping from said upper end of said casing and striking a said strut will be deflected to either side of said apex to facilitate scattering and mixing of particulate material within said chamber.

7. A distribution tower for storing particulate material and for weighing and mixing predetermined combinations of such material comprising:
an upright tower framework;
a plurality of storage containers for the particulate material, each said storage container being supported by said tower framework and each including a container discharge valve thereon capable of selectively discharging the material from said storage container;
an enclosure carried by said tower framework and defining a chamber, said chamber communicating with said container discharge valves of said plurality of storage containers so as to receive material discharged from said containers;
an enclosure discharge valve communicating with said chamber of said enclosure to selectively discharge particulate material from said chamber;
weighing means operatively connected with said enclosure to weigh material within said chamber and to visibly indicate the weight of the material in said chamber to an operator to thereby permit predetermined quantities of the material from said storage containers to be combined in said chamber in predetermined weight combinations;
material mixing means extending within said chamber of said enclosure for mixing particulate material within said chamber to obtain a generally homogeneous mixture of such material;
said material mixing means including:
a substantially upright, stationary, hollow casing having upper and lower ends, said casing being positioned within said chamber;
an auger having an elongated shaft with central longitudinal axis and lifting flights along said shaft, said auger being mounted for rotation about said shaft axis within said casing to raise particulate material from said lower end of said casing to said upper end of said casing to thereby circulate and mix particulate material within said chamber; and
wherein said enclosure has a sidewall, and said mixing means further includes a plurality of stationary baffle plates within said enclosure, spaced from one another along said sidewall and extending from the sidewall of said enclosure toward said casing to intercept some particulate material falling from said upper end of said casing and to deflect the intercepted material toward said casing to further mix the material within said enclosure.

8. The distribution tower of claim 7 wherein said plurality of baffle plates are collectively arranged in a funnel-like configuration within said enclosure and each said baffle plate is carried by said sidewall and extends toward and is angled downwardly toward said casing to cause particulate material striking a said baffle plate to be directed downwardly along the said baffle plate and toward said casing.

9. The distribution tower of claim 8 wherein said mixing means further includes a flared distribution shield fixed to said casing adjacent the lower end of said casing and positioned below said baffle plates and cooperating with said plates by receiving material discharged from the said baffle plates and deflecting such material outwardly from said flared shield and toward said sidewall.

10. The distribution tower of claim 9 wherein said mixing means further includes an arm fixed to said auger above said upper end of said casing to rotate with said auger shaft and extending substantially radially from said shaft to strike particulate material being discharged from said upper end of said casing, and said arm cooperating with said funnel-like configuration by urging particulate material outwardly from said casing and toward said baffle plates to facilitate mixing of the material.

11. A distribution tower for storing particulate material and for weighing and mixing predetermined combinations of such material comprising:
an upright tower framework;
a plurality of storage containers for the particulate material, each said storage container being supported by said tower framework and each including a container discharge valve thereon capable of selectively discharging the material from said storage container;
an enclosure carried by said tower framework and defining a chamber, said chamber communicating with said container discharge valves of said plurality of storage containers so as to receive material discharged from said containers;
an enclosure discharge valve communicating with said chamber of said enclosure to selectively discharge particulate material from said chamber;
weighing means operatively connected with said enclosure to weigh material within said chamber and to visibly indicate the weight of the material in said chamber to an operator to thereby permit predetermined quantities of the material from said storage containers to be combined in said chamber in predetermined weight combinations;
material mixing means extending within said chamber of said enclosure for mixing particulate material within said chamber to obtain a generally homogeneous mixture of such material;
said material mixing means including:
a substantially upright, stationary, hollow casing having upper and lower ends, said casing being positioned within said chamber;
an auger having an elongated shaft with central longitudinal axis and lifting flights along said shaft, said auger being mounted for rotation about said shaft axis within said casing to raise particulate material from said lower end of said casing to said upper end of said casing to thereby circulate and mix particulate material within said chamber;

said mixing means further including a bearing assembly mounted to said enclosure and rotatably mounting said auger shaft for rotation about said shaft axis;

said bearing assembly including:
- an auger shaft bearing rotatably engaging said auger shaft below said lower end of said casing;
- a pair of mating, arcuate collar portions, each said collar portion including an outer band having an inner concave periphery adapted to be clamped to said enclosure adjacent said enclosure discharge valve;
- each said collar portion including a pair of rigid spokes fixed to and extending from said concave periphery of said outer band and converging toward one another;
- each said collar portion further including an inner band fixed to said spokes and spaced from said outer band, the said inner bands of said collar portions being adapted to receive and retain said bearing; and
- means for connecting said collar portions in mating relationship to clamp said collar portions to said enclosure.

12. The distribution tower of claim 11 wherein said enclosure includes a circular cross section discharge duct engaging said enclosure discharge valve and having a central axis, and said discharge duct having four generally upright spoke receiving channels therethrough to receive said spokes of said collar portions through said channels so that said inner bands are within said duct and can retain said auger shaft bearing on said central axis of said discharge duct.

* * * * *